(No Model.)
C. J. W. SHEARER.
COFFEE ROASTER.
No. 331,828. Patented Dec. 8, 1885.
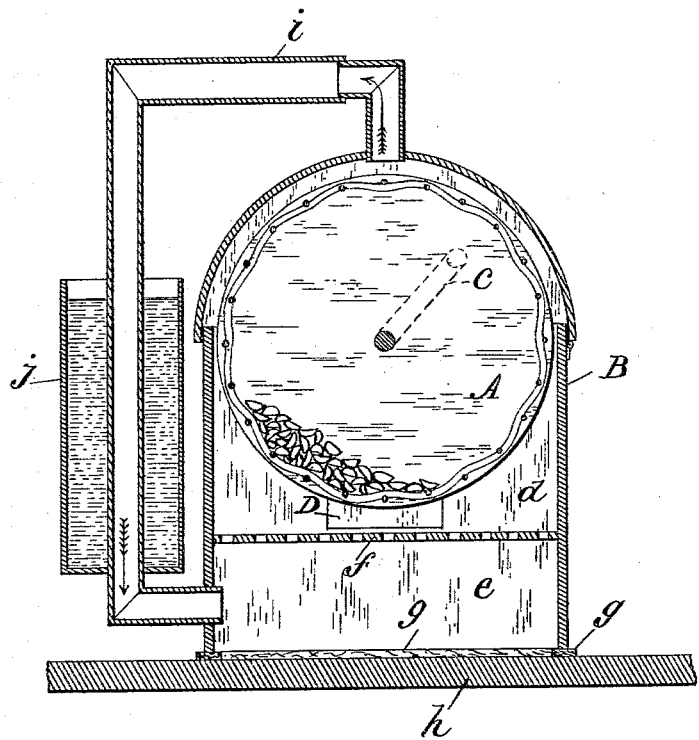
WITNESSES.
O. P. Hood.
M. Carsten
INVENTOR.
Charles J. W. Shearer.
By H. P. Hood
Atty.

UNITED STATES PATENT OFFICE.

CHARLES J. W. SHEARER, OF INDIANAPOLIS, INDIANA.

COFFEE-ROASTER.

SPECIFICATION forming part of Letters Patent No. 331,828, dated December 8, 1885.

Application filed July 13, 1885. Serial No. 171,442. (No model.)

*To all whom it may concern:*

Be it known that I, CHARLES J. W. SHEARER, a citizen of the United States, residing at Indianapolis, in the county of Marion and State of Indiana, have invented a new and useful Improvement in Coffee-Roasters, of which the following is a specification.

My invention relates to an improved device for roasting coffee, peanuts, and other like materials.

The objects of my invention are to prevent the escape into the surrounding atmosphere of the fumes from the roasting material, and to produce a circulation of the air contained in the roasting-chamber through the said material.

The accompanying drawings illustrate my invention.

The figure represents a vertical transverse section of my roasting device.

A is the roasting-cylinder, formed, preferably, of wire-cloth arranged to receive the coffee or other material to be roasted, and mounted on a shaft, so as to be revolved in a closed case, B, by means of a crank, c. The top of case B is hinged to one side, so as to be raised to admit the roasting-cylinder, and the case is divided into two compartments, d and e, by a perforated horizontal partition, f. The lower compartment, e, is open at the bottom, but the lower edges of the case are designed to form, by means of strips of asbestus felt g, or other suitable packing material secured thereto, a tight joint with the top of the stove h, or other suitable heating-surface. Compartments d and e are connected by a tube, i, passing from the top of compartment d, and discharging into the side of compartment e. The lower portion of tube i passes through a refrigerating-tank, j, which is filled with cold water or other refrigerating material, the object being to cool the air in that portion of the tube, and thereby produce a downward movement therein.

D is a door in the side of the compartment d, through which the chaff falling from the roaster may be withdrawn.

The operation of my device is as follows: The material to be roasted having been placed in the cylinder A and the top of the case closed down, the case is placed on the top of a heated stove, thus closing compartment e. As the air in the case becomes heated it passes upward through the roasting-cylinder into the upper portion of the tube i, its place being taken by cold air passing into compartment e from the lower part of the tube. A circulation having thus been established, the coffee or other material is quickly roasted, and the volatile portions, instead of passing off into the surrounding atmosphere, are passed repeatedly through the roasting material, and are reabsorbed by the material while cooling.

The purpose of partition f is to cause the distribution of the cold air from tube i over the heated surface of the stove, and thereby insure its thorough heating before passing upward through the roasting-cylinder.

I claim as my invention—

1. In a coffee-roaster, the combination, with a closed chamber and a roasting-cylinder arranged to rotate therein, of a tube connecting the upper and lower portions of said chamber, and a refrigerating-tank surrounding a portion of said tube, substantially as and for the purpose set forth.

2. In a coffee-roaster, case B, having compartments d and e, separated by a perforated partition, cylinder A, arranged to revolve within compartment d, tube i, and refrigerating-tank j, all combined and arranged to cooperate substantially as and for the purpose specified.

CHARLES J. W. SHEARER.

Witnesses:
 WILLIAM D. LANE,
 SAMUEL STEPHENS.